(12) United States Patent
Grigg et al.

(10) Patent No.: US 8,666,895 B2
(45) Date of Patent: Mar. 4, 2014

(54) SINGLE ACTION MOBILE TRANSACTION DEVICE

(75) Inventors: David M. Grigg, Rock Hill, SC (US); John Franklin Tuders, Harrisburg, NC (US); Peter John Bertanzetti, Charlotte, NC (US); Tony England, Tega Cay, SC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/401,117

(22) Filed: Feb. 21, 2012

(65) Prior Publication Data

US 2012/0197743 A1 Aug. 2, 2012

Related U.S. Application Data

(63) Continuation-in-part of application No. 13/017,835, filed on Jan. 31, 2011, and a continuation-in-part of application No. 13/017,823, filed on Jan. 31, 2011, now Pat. No. 8,195,576.

(51) Int. Cl.
*G06Q 20/40* (2012.01)

(52) U.S. Cl.
USPC .............. 705/44; 705/16; 705/40; 705/39; 705/64; 705/26.35; 455/413; 455/466; 379/114.01; 370/352; 235/380

(58) Field of Classification Search
USPC ............. 705/44, 16, 64, 40, 39, 26.35, 34; 379/114.01; 455/413, 466; 370/352; 235/380
See application file for complete search history.

(56) References Cited

U.S. PATENT DOCUMENTS

| 7,071,113 | B2 | 7/2006 | Kim et al. |
| 7,255,264 | B2* | 8/2007 | De Leon .................. 235/375 |
| 8,083,137 | B2* | 12/2011 | Tannenbaum ............. 235/380 |
| 2006/0021003 | A1 | 1/2006 | Fisher et al. |

(Continued)

FOREIGN PATENT DOCUMENTS

GB 2401015 A 10/2004

OTHER PUBLICATIONS

Grigg, David M. et al. U.S. Appl. No. 13/017,823, filed Jan. 31, 2011.

(Continued)

*Primary Examiner* — Vanel Frenel
(74) *Attorney, Agent, or Firm* — Michael A. Springs; Moore & Van Allen, PLLC; Andrews D. Gerschutz

(57) ABSTRACT

Embodiments of the invention allow a user to wirelessly transmit payment information from a mobile device to a point-of-sale terminal by the user performing only a minimum number of inputs, such as a single input. Some embodiments of the invention provide an apparatus comprising an input device configured to receive input from a user, a communication device configured to transmit wireless signals to a transaction device, a memory comprising predetermined payment information stored therein and a processor communicably coupled to the input device, the communication device and the memory and configured to: receive transaction information from the transaction device related to a transaction; receive a first input from the user; determine if the first input matches a user defined action stored in memory, and use the communication device to wirelessly transmit the predetermined payment information and authorize payment if the first input matches the user defined action stored in memory.

20 Claims, 7 Drawing Sheets

(56) References Cited

U.S. PATENT DOCUMENTS

2006/0123465 A1    6/2006   Ziegler
2010/0051685 A1    3/2010   Royyuru et al.
2010/0125495 A1    5/2010   Smith et al.
2010/0202346 A1*   8/2010   Sitzes et al. .................. 370/328
2010/0217709 A1*   8/2010   Aabye et al. ................... 705/44

OTHER PUBLICATIONS

Meyer, Roger. Secure Authentication on the Internet (Apr. 4, 2007). Retrieved online Mar. 27, 2012. http://www.sans.org/reading_room/whitepapers/securecode/secure-authentication-internet_2084. 36 pps.

* cited by examiner

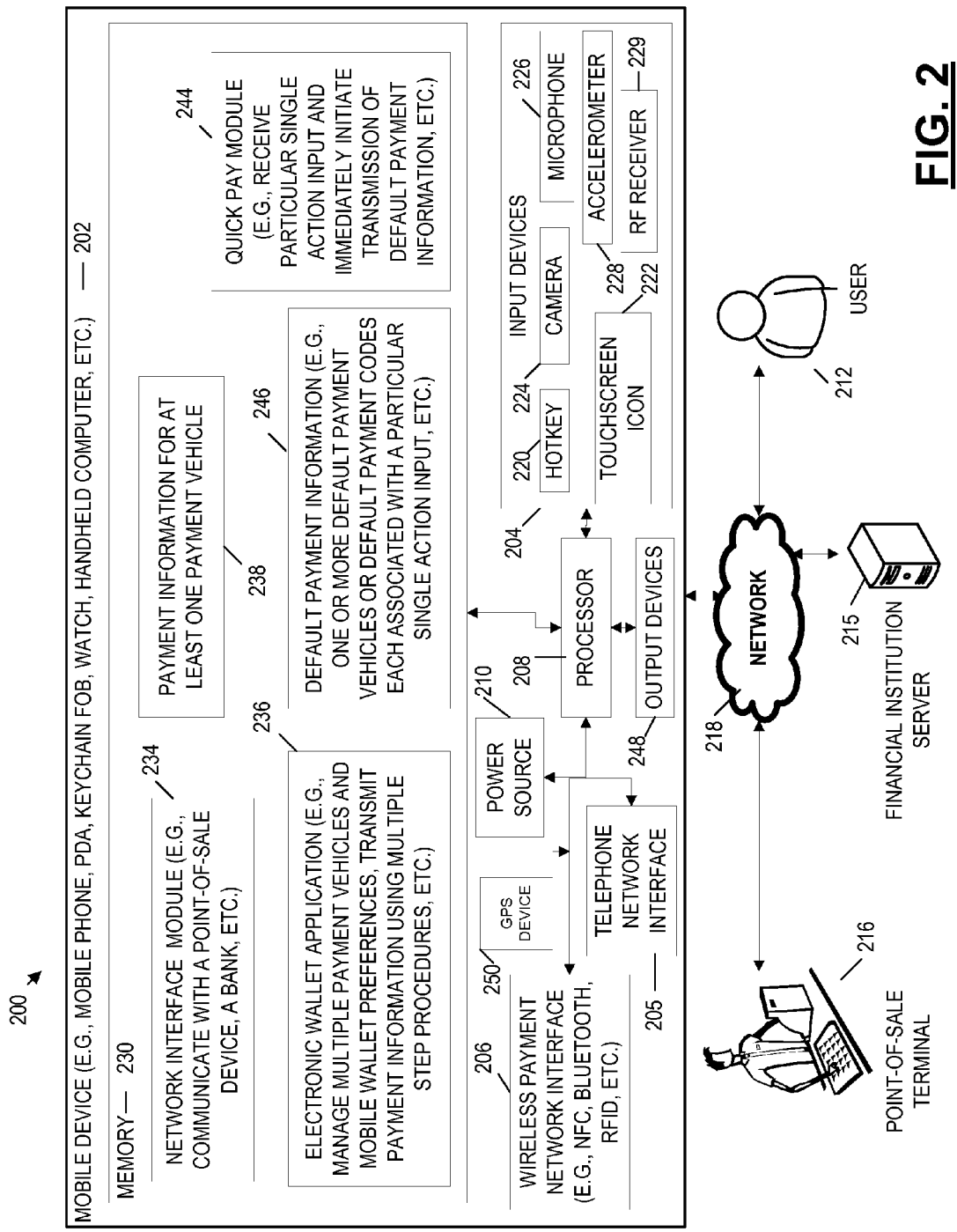

SINGLE ACTION MOBILE TRANSACTION DEVICE

CROSS REFERENCE TO RELATED APPLICATIONS

The present invention is a continuation-in-part of U.S. patent application Ser. No. 13/017,835, entitled, "Transaction Authorization System for a Mobile Commerce Device," filed on Jan. 31, 2011 and Ser. No. 13/017,823, entitled "Mobile Transaction Device Security System," filed on Jan. 31, 2011 both applications having been assigned to the assignee of the present application, the contents of which are hereby incorporated by reference in their entirety.

BACKGROUND

There is a need for apparatuses and methods that provide fast, convenient authorization of payment for financial transactions. There is also a need to lessen the burden associated with carrying credit cards, checks, cash, and other payment vehicles.

BRIEF SUMMARY

Embodiments of the present invention address the above needs and/or achieve other advantages by providing apparatuses (e.g., systems, computer program products, and/or other devices) and methods that allow a user to assign a user defined action for wirelessly transmitting payment information from a mobile device to a point-of-sale terminal by the user performing the user defined action without the need to provide any additional authentication or input. For example, some embodiments of the invention allow a user to assign a default payment vehicle to a particular key or "pay now" icon of the mobile device so that activation of the particular key or icon, alone, causes the mobile device to wirelessly transmit information about the default payment vehicle and authorizes payment without the need to go through a separate authentication procedure before the mobile device transmits the default payment information. In some embodiments of the invention, if a user uses a minimum action, such as a single action option, the mobile device is configured to transmit the payment information without needing to first launch an electronic wallet software application installed on the device or at least without needing to fully launch the electronic wallet software.

In particular, according to various embodiments, an apparatus is provided that includes an input device configured to receive input from a user, a communication device, such as a near field communication device, that is configured to transmit wireless signals to a transaction device, a memory comprising predetermined payment information stored therein comprising a user defined action for authorizing a wireless payment and a processor communicably coupled to the input device, the communication device and the memory. In such embodiments, the processor is configured to receive transaction information from the transaction device related to a transaction, receive a first input from the user, determine if the first input matches the user defined action for authorizing a wireless payment and use the communication device to wirelessly transmit the predetermined payment information and authorize payment if the first input matches the user defined action stored in the memory. In some embodiments, the apparatus is a mobile device such as a mobile phone. In some embodiments, the transaction device is a merchant point-of-sale terminal.

In certain embodiments, the user defined action is selected from at least one of a button operatively coupled to the processor, a single key of the input device, combination of keys on the input device actuated simultaneously, a combination of keys on the input device actuated in a pattern, the actuation of a specific key of the input device after a predetermined number of random key strokes, a voice pattern, a spoken word, a spoken phrase, language patterns, biometric data, a specific movement of the apparatus, a specific change in the orientation of the apparatus or a selectable icon presented on a display of the apparatus.

In some embodiments, the memory device includes an electronic wallet application stored therein, and the processor is configured to use the wireless transmitter to wirelessly transmit default payment information to the transaction device without requiring the launching of the electronic wallet if the first input matches the user defined action stored in the memory. In certain embodiments, the processor is also configured to send a denial notification to the transaction system if the first input does not match the user defined action saved in the memory.

In yet further embodiments, the processor is also configured to request a user defined username and password, store the username and password in the memory request the user provide the username and password if the first input received from the user does not match the user defined action saved in the memory, receive a second input from the user, wherein the second input comprises a username and password, determine if the second input matches the username and password saved in the memory and send an allowance notification to the transaction device if the second input matches the user name and password and a denial notification if it does not.

Consistent with some embodiments, the payment information stored in the memory further comprises transaction parameters, wherein the transaction parameters determine the user defined input required to authorize a transaction. In such embodiments, the transaction parameters may be selected from one or more of the amount of the transaction, the merchant, the items being purchased, the user's transaction history, the available funds in the user's accounts, the location of the apparatus or the presence of an identified individual. In some such embodiments, the processor is further configured to analyze the transaction information from the transaction device and correlate the transaction information to the transaction parameters.

According to particular embodiments, a computer program product is provided comprising a non-transitory computer readable medium with computer-executable code stored thereon, the computer-executable code comprising a first code portion configured to receive transaction information related to a transaction from a transaction device (e.g. a merchant point-of-sale terminal), a second code portion configured to receive a first input from the user, a third code portion configured to determine if the first input matches a user defined action for authorizing a wireless payment stored in the memory and a fourth code portion configured to use a communication device, such as a near field communication device, to wirelessly transmit predetermined payment information and authorize payment if the first input matches the user defined action stored in the memory.

In some such embodiments, the user defined action is selected from at least one of a button operatively coupled to the processor, a single key of the input device, combination of keys on the input device actuated simultaneously, a combination of keys on the input device actuated in a pattern, the actuation of a specific key of the input device after a predetermined number of random key strokes, a voice pattern, a spoken word, a spoken phrase, language patterns, biometric data, a specific movement of a mobile device, a specific change in the orientation of the mobile device or a selectable icon presented on a display of the apparatus.

According to some embodiments, the computer program product may also include a code portion comprising an electronic wallet application that is configured to use the communication device to wirelessly transmit the predetermined payment information to the transaction device without requiring the launching of the electronic wallet application prior to wirelessly transmitting the default payment information if the first input matches the user defined action stored in the memory.

In certain embodiments the computer program product includes an additional computer-executable code portion configured to send a denial notification to the transaction device if the first input does not match the user defined action saved in the memory. In other embodiments the computer-executable code further comprises a fifth code portion configured to request a user defined username and password and store the user defined username and password in the memory, a sixth code portion configured to request the user provide the username and password if the first input received form the user does not match the user defined action saved in the memory, a seventh code portion configured to receive a second input from the user, wherein the second input comprises a username and password, an eight code portion configured to determine if the second user input matches the username and password saved in the memory a ninth code portion stored in the memory and configured to send an allowance notification to the transaction device if the second input matches the username and password saved in the memory and a tenth code portion configured to send a denial notification to the transaction system if the second input does not match the username and password saved in the memory.

Consistent with some embodiments, the computer-executable code further comprises a code portion configured to receive from the user transaction parameters, wherein the transaction parameters determine the user defined action required to authorize a transaction, such transaction parameters may include the amount of the transaction, the merchant, the items being purchased, the user's transaction history, the available funds in the user's financial accounts, the location of the purchase or the presence of an identified individual. In some such embodiments, the computer-executable code further comprises a code portion configured to analyze the transaction information and correlate the transaction information to the transaction parameters.

Certain embodiments of the invention also include a method for authorizing a mobile transaction device payment, wherein the method involves receiving a security protocol from a user, the security protocol comprising a permission module and authentication modules, wherein the authentication modules comprise user defined actions for authorizing wireless payments. The method further involves determining, via a processor, that the user is conducting a transaction, comparing the transaction with the permission module, determining, via the processor, the authentication module required to authorize the wireless payment based on the comparison of the transaction with the permission modules, receiving a first input from the user, comparing the first input with the required authentication module and communicating predetermined payment instructions and authorizing the transaction if the first input is consistent with the required authentication module. In some such embodiments the permission modules comprise transaction parameters and receiving a security protocol from a user comprises receiving instructions for prompting the permission module and receiving transaction parameters from the user. In other embodiments, receiving a security protocol from a user comprises receiving instructions for prompting the authentication modules and receiving user defined actions for authorizing wireless payments.

In some embodiments, determining that the user is conducting a transaction comprises receiving a signal from a point-of-sale device indicating that the user is attempting to conduct a transaction. In certain embodiments, the method includes the additional steps of receiving a username and password from the user, prompting the user to enter the username and password if the first input is not consistent with the required authentication module, receiving a second input from the user, comparing the second input to the username and password and communicating predetermined payment instructions and authorizing the transaction if the second input is consistent with the username and password.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
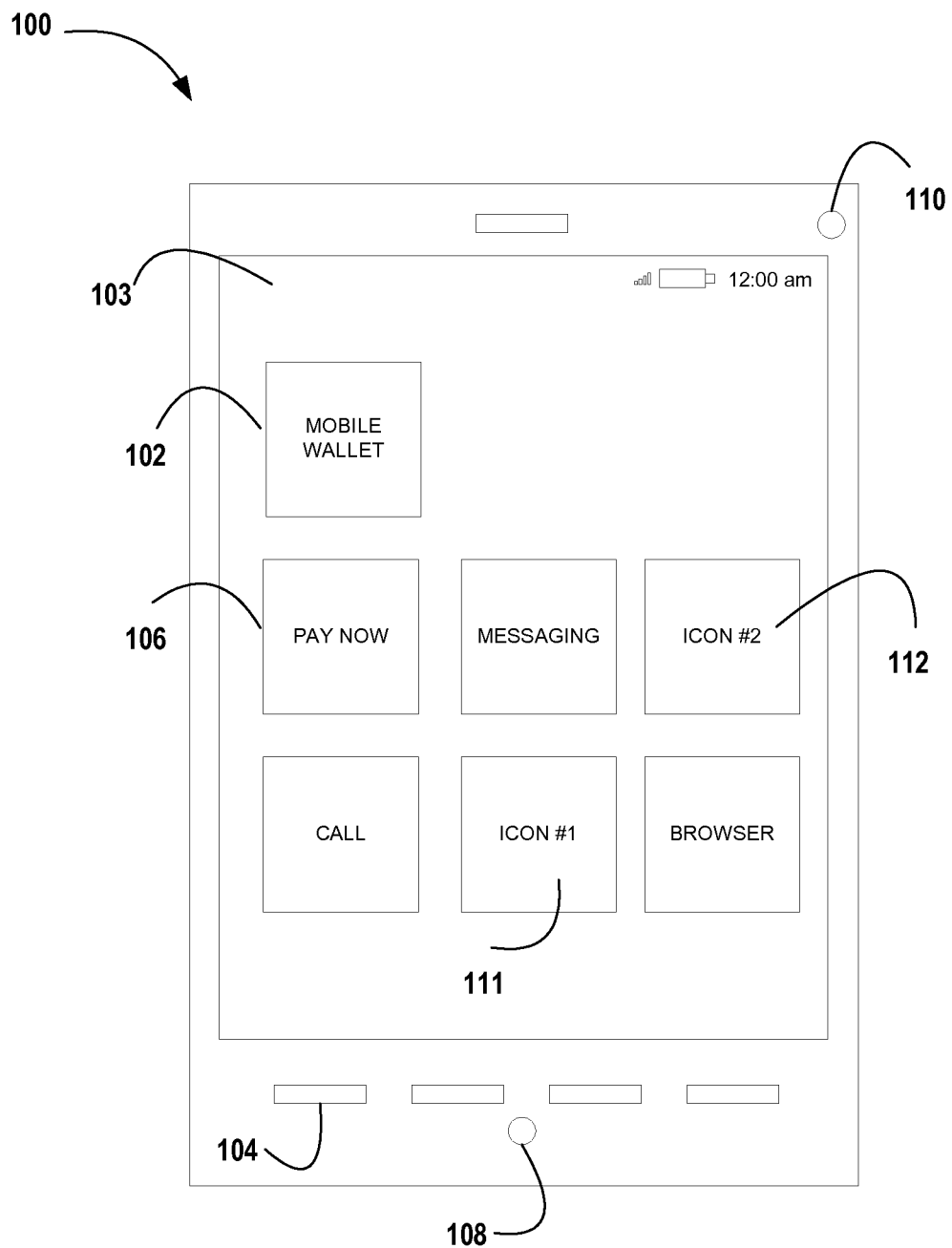
Figure 3A:
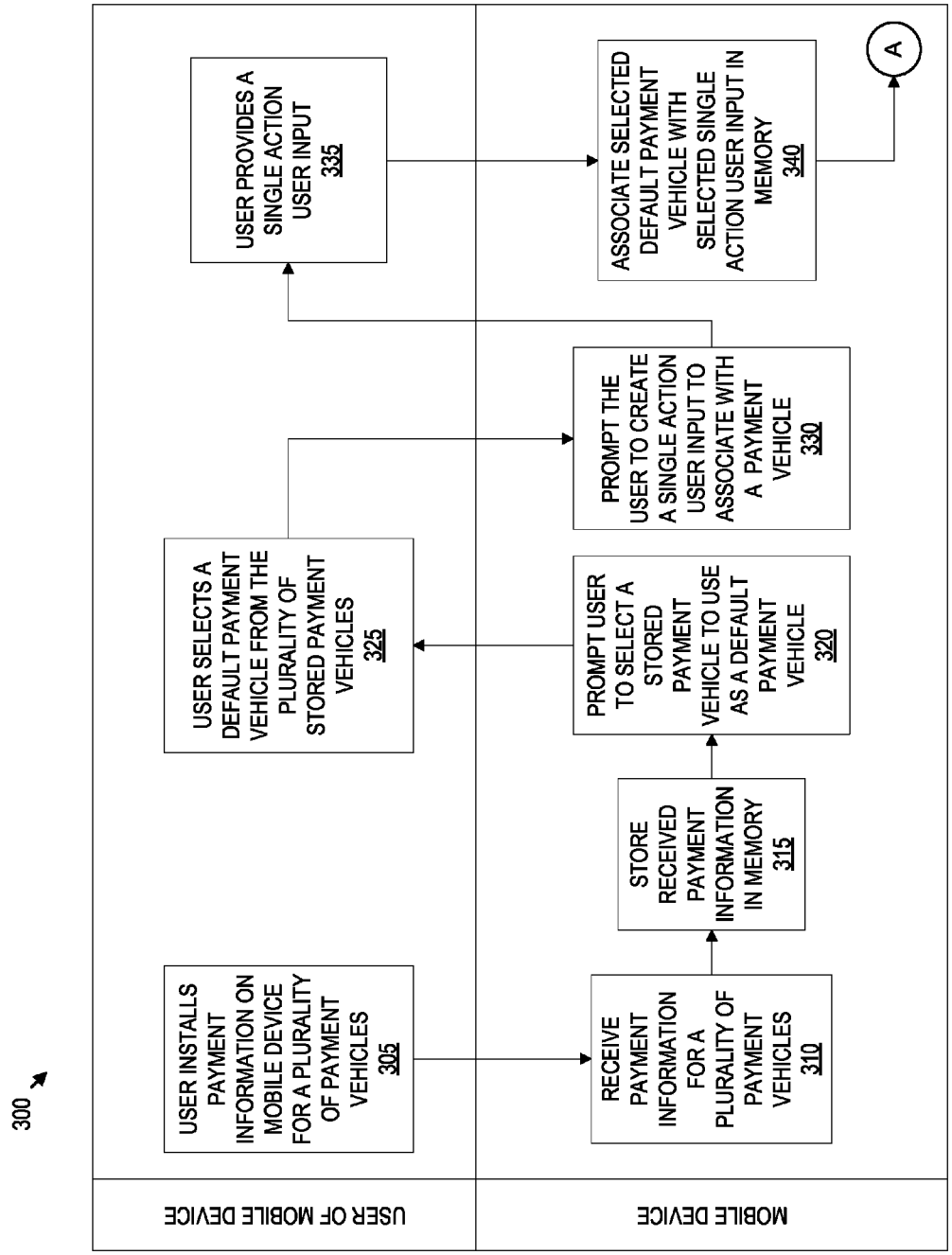
Figure 3B:
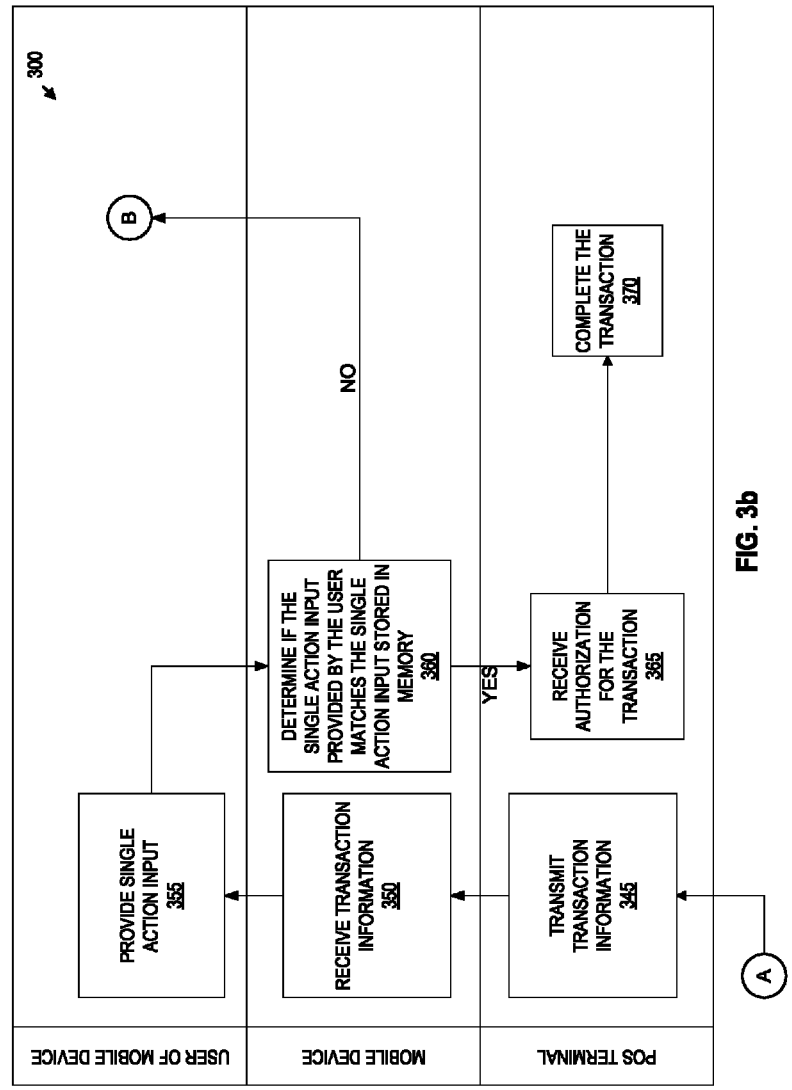
Figure 3C:
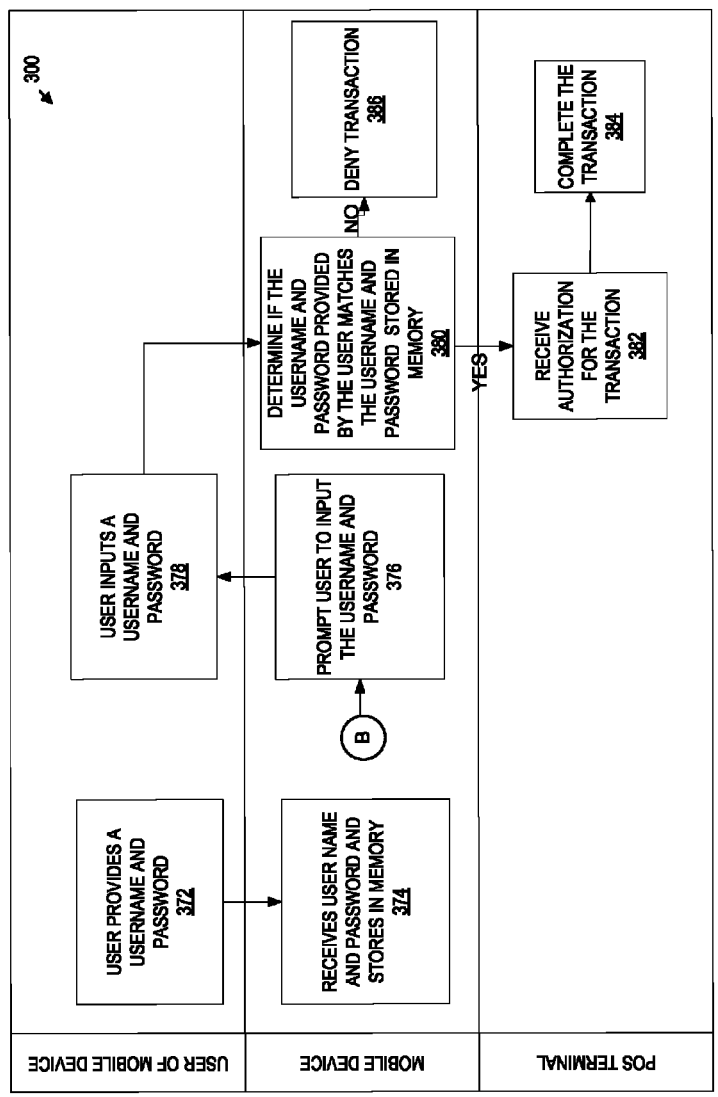
Figure 4:
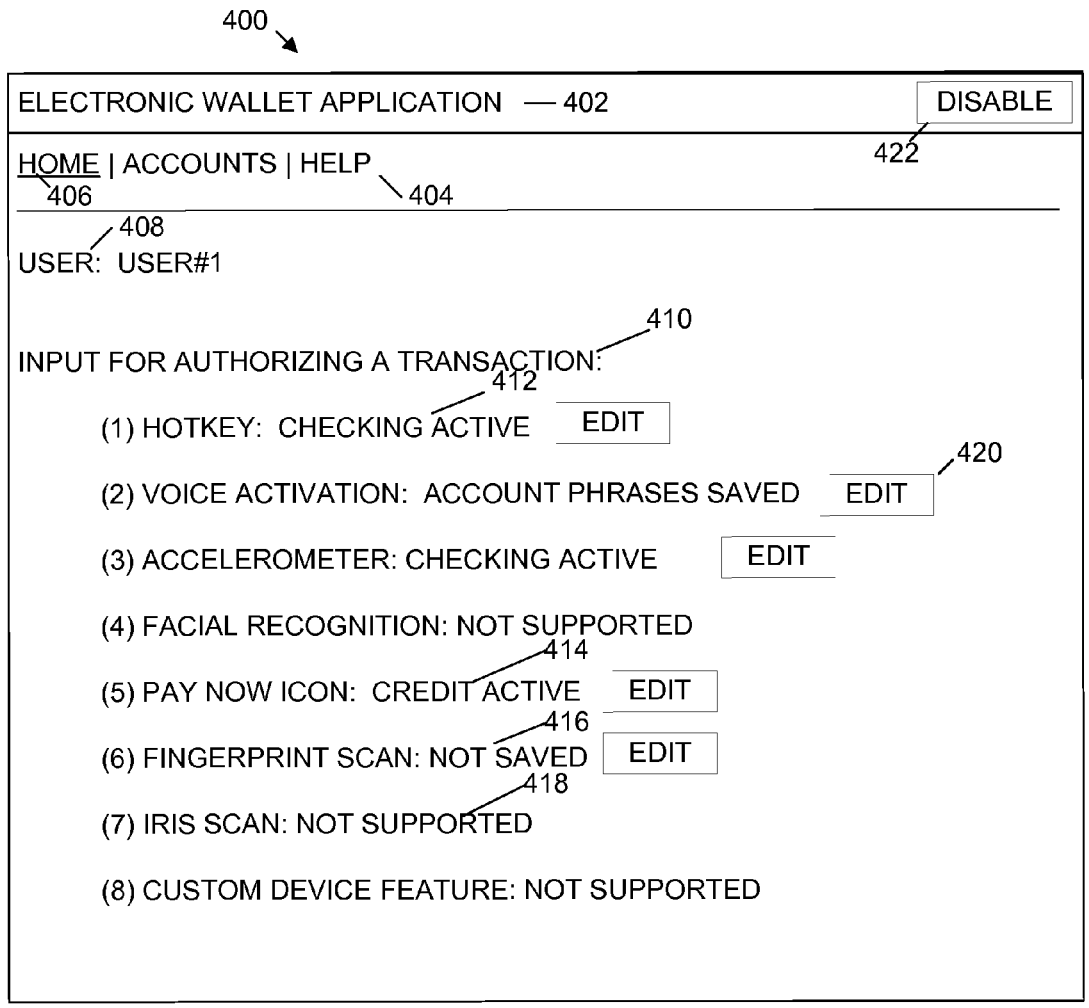
Figure 5:
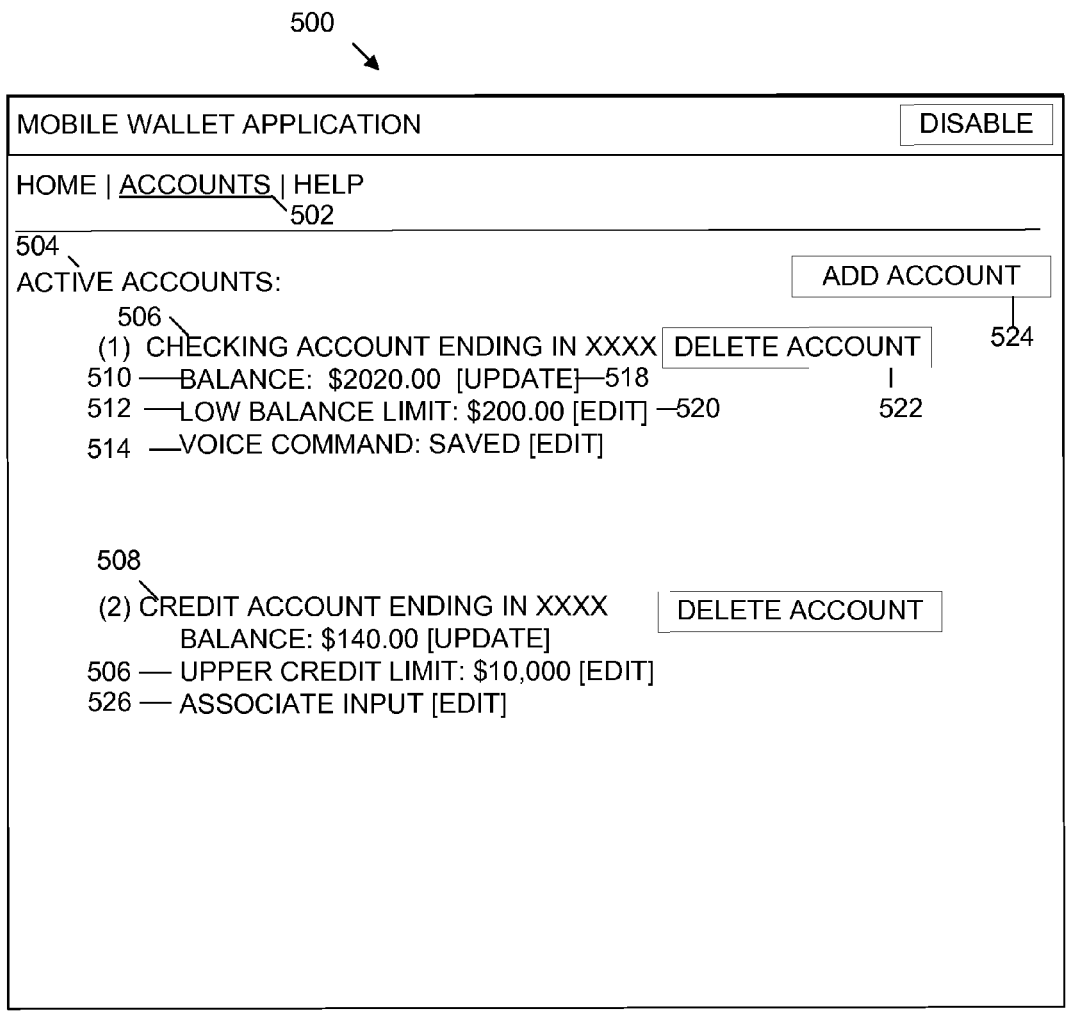

Having thus described embodiments of the invention in general terms, reference will now be made to the accompanying drawings, wherein:

FIG. 1 provides an example of a mobile transaction device, in accordance with an embodiment of the present invention;

FIG. 2 provides a block diagram illustrating a mobile transaction device, in accordance with an embodiment of the present invention;

FIG. 3a provides a flow diagram illustrating a process for configuring a mobile transaction device, in accordance with embodiments of the present invention;

FIG. 3b provides a flow diagram illustrating a process for using the mobile transaction device to engage in a transaction at a point-of-sale, in accordance with embodiments of the present invention;

FIG. 3c provides a flow diagram illustrating a process for using the mobile transaction device to engage in a transaction at a point-of-sale, in accordance with embodiments of the present invention;

FIG. 4 provides an example of a graphical user interface associated with the mobile transaction device, in accordance with one embodiment of the present invention; and FIG. 5 provides an example of a graphical user interface associated with the mobile transaction device, in accordance with one embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Mobile electronic wallets (also sometimes referred to herein simply as "mobile wallets") have been proposed and created by the inventors and assignee of the present invention.

A mobile electronic wallet is a mobile phone or similar device that can store information about a plurality of payment vehicles (e.g., credit cards, debit cards, gift cards, investment accounts, savings accounts, and/or the like) associated with the user and wirelessly transmit information about a selected payment vehicle to a point-of-sale terminal or other device to engage in a financial transaction using the selected payment vehicle. Mobile electronic wallets have many advantages in that they can allow a user to conveniently carry multiple payment vehicles (e.g., electronic credit cards, debit cards, gift cards, coupons, and/or the like) in a device that the user already carries with them at all times, such as a mobile phone.

The inventors of the present application have determined that the mobile wallets that have been proposed in the past are often not convenient enough for many potential users because these existing mobile wallets require a user to perform too many actions at the point-of-sale (POS) before the payment vehicle is communicated to the POS terminal. For example, before the payment information is transmitted to the POS terminal, the user is often required to: (1) find the electronic wallet application on the user's mobile phone; (2) launch the electronic wallet application; (3) perform one or more authentication procedures using the electronic wallet application; (4) select the payment vehicle from a plurality of payment vehicles stored in the electronic wallet application; (5) instruct the electronic wallet to transmit the selected payment vehicle; and (6) in some cases, confirm that the user wants to transmit the selected payment information. Users, however, are accustomed to using their physical credit or debit cards quickly, by pulling the physical card out of their wallet and swiping it through the magnetic stripe reader of the POS terminal. If the mobile electronic wallets are too inconvenient for many users or have require too many steps, mobile electronic wallets may never catch on and become widely adopted.

Recognizing this problem, the inventors of the present invention have developed apparatuses and methods wherein a mobile electronic wallet wirelessly transmits a particular selected payment vehicle in response to the user performing a minimum number of actions such as a single action or supplying only a single input to the mobile device. For example, some embodiments of the invention allow a user to assign a default payment vehicle to a particular key or "pay now" icon of the mobile device so that activation of the particular key or icon, alone, causes the mobile device to wirelessly transmit information about the default payment vehicle. In some embodiments of the invention, a user using the single action option of the mobile device does not need to go through an authentication procedure before the mobile device transmits the default payment information. In some embodiments of the invention, if a user uses the single action option, the mobile device is configured to transmit the payment information without needing to first fully launch an electronic wallet application installed on the device. These embodiments of the invention, and others, are described in greater detail below with reference to the various figures.

FIG. 1 provides an example of a mobile device 100, such as a mobile phone, in accordance with one embodiment of the present invention. In some embodiments, the mobile device 100 will include a touch screen 103 with a number of selectable icons for accessing various functionalities of the mobile device 100, including an electronic wallet application 102, which is a software application installed on the mobile device 100 that manages the user's mobile wallet. Specifically, a user may download the mobile wallet application 102 from a server to the mobile device 100. Alternatively, the mobile device 100 may come with the mobile wallet application 102 preloaded on the memory of the mobile device 100. The user may then store payment information in a secure section of the memory of the mobile device 100. In some embodiments, the payment information may be downloaded from one or more servers associated with the user's financial institutions. In other embodiments, the user may be required to manually input the particulars of the various payment vehicles. The user can then use the mobile wallet application 102 to manage and use the payment vehicles stored in the mobile device 100.

For example, a user at a POS terminal wishing to use the mobile wallet could enter user input by selecting the electronic wallet application 102 which would then cause the mobile device 100 to launch a full version of the electronic wallet application 102. The electronic wallet application 102 may then require the user to authenticate herself by prompting the user to, for example, enter a personal identification number (PIN) into the mobile device 100. The electronic wallet application 102 then may display to the user several payment vehicles that are stored on the mobile device 100 and that are available to the user for making a payment at the POS terminal. The user could then select one of the payment vehicles and then instruct the mobile wallet application to wirelessly transmit payment information about the selected payment vehicle to the POS terminal. Often, the mobile wallet application 102 has numerous other features that may help the user select a payment vehicle, such as balance information and other account information for each payment vehicle stored therein. The electronic wallet application 102 also typically presents user-friendly graphical user interfaces (GUIs) that illustrate, for example, images of or logos associated with each payment vehicle, as well as other helpful graphics.

As an alternative to using the full version of the electronic wallet application 102 in the manner just described, if the user approaching the POS terminal already knows that she wants to use a particular pre-selected default payment vehicle and if the user is comfortable not requiring pre-authentication prior to the mobile device 100 transmitting payment information, then the user can use a single action input, such as a "pay now" icon 106 displayed on the screen 103 of the mobile device 100 in order to avoid launching a full version of the mobile wallet application 102 and going through multiple steps to use the full version of the mobile wallet application 102 to select a payment vehicle and transmit the selected payment vehicle. In response to the user's selection of the "pay now" icon 106 alone (e.g., a single user action), the mobile device 100 automatically, and wirelessly transmits payment information associated with a default payment vehicle. This payment information can then be received by a wireless receiver at the POS terminal (or another transaction device, such as another mobile device in a person-to-person transaction). In some embodiments of the invention, the transaction authorization system allows the user to select a particular payment vehicle from a plurality of the user's payment vehicles and identify the selected payment vehicle as the default payment vehicle that is to be associated with the single action input, such as the "pay now" icon 106. As is understood, the name of the icon has no bearing on the functional capabilities and the "pay now" icon may have any name.

The type of single action input used to cause the mobile device 100 to transmit the default payment information may be any type of input that the mobile device is capable of receiving. In this regard, single action inputs other than a quick pay icon described above may be used to initiate the "quick pay" option of the mobile device 100. The single action input may be tactile, visual, audible, wireless, location based or any combination of the foregoing. In some embodiments, the single action input is standardized, such as a dedicated hot key 104 on the mobile device 100 or a "pay now" icon displayed on the screen 103 of the mobile device 100. In other embodiments, the input is personalized for the user, such as a user-selected hotkey 104 or other configurable button, a user-selected combination of buttons that the user must enter simultaneously, a user-selected word or phrase spoken through the microphone 108, and/or the like. In embodiments of the invention where the user can assign the quick pay function to a non-obvious single action input, the transaction authorization system provides both convenience and security because the user can easily authorize the transaction by providing the single action input, but another person using the mobile device 100 may not be able to easily figure out the single action input needed to use the quick pay feature of the mobile wallet.

As discussed, an exemplary embodiment of the single action input device is a hotkey 104 on the mobile device 100. In some embodiments of the invention, the hotkey 104 is a dedicated button on the mobile device 100. For example, a cell phone can be sold with a specialized button on the front or side of the phone that, when pressed, causes the phone to wirelessly transmit default payment information using a wireless protocol capable of being received by a transaction device (e.g., a POS terminal, other mobile device, automated teller machine, etc.).

In other embodiments of the invention, the hotkey 104 is a generic button on the mobile device 100 that can be customized by the user and assigned a function. For example, the user may indicate that a general purpose button 104 on the mobile device 100 functions as a single action input for purposes of wirelessly transmitting payment information. In another example, a selectable alphanumeric key pad is presented on the screen 103 of the mobile device 100 (not shown) and the user indicates that a single key or combination of keys pressed simultaneously or in sequence is the single action input that can be used to quickly transmit default payment information without requiring additional authentication. For example, the user may assign the letter "H" as the key that must be pressed to wirelessly transmit default payment information or the number "1" on the mobile device 100 keypad and the "#" button pressed simultaneously. Alternatively, the user may assign different single action inputs as authorizing payments from different payment vehicles. Using the example above, selecting the "H" key may authorize a payment from the user's debit account, whereas selecting the number "1" and "#" authorizes payment from the user's credit card account without further authorization.

In some embodiments, the user may elect to have more than one icon (e.g. 111, 112) presented on the screen 103 of the mobile device 100 for quickly authorizing payment through a single user action. In some instances, each of a plurality of icons may authorize payment from each of a plurality of different payment vehicles associated with the icons in the memory of the mobile device 100. In some such embodiments the icons will be designed in such a way so that the association with the mobile wallet and/or wireless payment transmission is not clear. For instance, the icons may be designed to appear to be associated with launching an unrelated application. In other embodiments, multiple icons are presented on the screen 103 of the mobile device but only some of the icons are associated with making a wireless payment, whereas others might lock-out the mobile wallet application preventing payment based on a single action input until the user fully launches the mobile wallet application and enters a separate authentication. For example, as shown in FIG. 1, selection of either the Pay Now icon 106 or icon #1 111 may wirelessly transmit default payment information using a wireless protocol capable of being received by a transaction device but selection of icon #2 disables the single action input capability of the mobile device 100 until such time as the electronic wallet application 102 is launched and the user authenticates his or her identity.

In still other embodiments of the invention, mobile device 100 includes a microphone 108 coupled to the mobile device 100 and configured to receive verbal input from the user. In an exemplary embodiment, the microphone 108 used for the mobile transaction device 100 is the same receiver that is used to capture the user's voice for use with the cell phone. For example, the user may speak into the phone to authorize a transaction just as the user would speak into the phone to converse with someone on a phone call. In one embodiment, the mobile transaction device 100 is configured to authorize the transaction if the user says a specific user-defined word or phrase. For example, the mobile transaction device may receive the input from the microphone, analyze the input to determine whether the user is qualified to authorize the transaction based on voice recognition software, and/or determine the desired payment vehicle based on speech recognition software.

For example, a user may create a quick pay voice command for the user's credit card with Bank A and debit card with Bank B by using the mobile wallet application 102 and then assign payment information to each command using the same application. For instance, the user may create a voice command "Bank A credit card" to use for instructing the mobile device 100 to instantly send the payment information for his credit card with Bank A, and a voice command "Bank B debit card" to use for instructing the mobile device 100 to instantly send the payment information for his debit card with Bank B. Once the commands are created, the user may be able to initiate a payment at a POS terminal by simply saying "Bank A credit card" or "Bank B debit card" depending on the card the user desires to use. The voice command may be any voice command selected by the user. In some instances, the authorization will be based off an analysis of the user's vocal qualities to confirm that the speaker is in fact the authorized user. In other embodiments, the voice authorization will be a particular word or phrase. Alternatively, the single action input may be a combination of the spoke command and voice qualities. In yet other embodiments, the voice authorization may be a pattern or rhythm of speech. For instance, the voice authorization may be a phrase wherein the third term is spoken exactly three seconds after the initial term.

Other embodiments may use biometrics both as the single action input. For example, in one embodiment of the invention the user presses a "pay now" icon on the touch screen of their mobile phone with the user's finger and the touch screen immediately scans the fingerprint of the finger pressing the icon and then immediately initiates transmission of the payment information if the fingerprint matches one stored in the phone's memory for the user. In other embodiments of the system, the mobile device 100 includes a camera 110 and the single action input may be face recognition or an iris scan. For example, the input device may be a still camera or a video camera, such as on a cell phone. In some embodiments, the camera 110 provides an image of the user to the transaction authorization system that triggers the transaction authorization system to complete the transaction. For example, facial recognition software may determine that the user is the user logged into the transaction authorization system and confirm that the user's financial account information should be transferred.

In a still further embodiment, the single action input involves an accelerometer incorporated into the mobile device 100. While not shown in FIG. 1, the accelerometer can be internal to the mobile device 100 and used to determine acceleration of the mobile device. In an embodiment, the single action input used to trigger transmission of the default payment information is the user moving, or accelerating, the mobile device 100 in a particular way, perhaps simultaneously in combination with the user depressing a button on the mobile device 100. For example, the user may be able to authorize payment by simply pushing a button on the side of the user's phone and simultaneously tapping the phone against the near-field-communication (NFC) receiver of the POS terminal. For example, the provider of the transaction authorization system may determine the level of acceleration that activates the payment. The speed with which the user typically moves the phone, such as when bringing the phone up to speak into, is insufficient to trigger the transaction authorization system, but flicking or moving the phone quickly towards the point-of-sale device would trigger automatic payment. The input received by the transaction authorization system is that the mobile commerce device has reached some minimum level of acceleration/deceleration, indicating a motion that would not occur in normal use of the mobile device. In other embodiments, the single action input may consist of the user manipulating the mobile device 100 in a specific pattern selected by the user, such as figure eight or square, to authorize the payment.

In another embodiment of the invention, the single action input comprises a wireless signal received by the mobile device 100 from a wireless transmitter, such as a radio-frequency (RF) or NFC transmitter located proximate to the POS terminal or other transaction device. In such an embodiment, the single action input would be moving the mobile phone within range of the transmitter. For example, the user may select a payment vehicle for the phone to use as a default. Many POS terminals, ATMs, and other transaction devices may be equipped with quick pay RF transmitters that transmit a standard RF signal that can be received by properly equipped mobile devices 100 and interpreted by the mobile device 100 as a command to transmit the user's default payment information. If the user desires to use her default payment vehicle, the user simply has to hold the mobile device 100 within range of the transmitter (which may be a very short range) and hold the mobile device 100 within range of the transaction devices NFC receiver. The single action input of holding the mobile device 100 within the range of the transmitter will cause the mobile device 100 to automatically begin wirelessly transmitting information for the default payment vehicle, and then the user simply has to move the mobile device 100 within range of the transaction device wireless payment information receiver.

In some embodiments of the invention, the single action input used for the quick pay option causes the mobile device 100 to transmit the default payment information without requiring additional authentication. In some such embodiments, using the single action input will fully launch the mobile wallet application and initiate a payment without further action from the user. In other such embodiments, using the single action input causes the mobile wallet application to partially launch. In other embodiments, the single action input used for the quick pay option causes the mobile device 100 to transmit the default payment information without requiring authentication before the transmission, but authentication may be required afterwards. In still other embodiments, the single action input used for the quick pay option causes the mobile device 100 to transmit the default payment information without requiring authentication in only certain transactions, such as transactions below a certain value or certain types of transaction.

In this regard, the quick pay option could be limited by quick-pay specific payment rules (e.g. transaction parameters) created by the user, the financial institution associated with the default payment vehicle, and/or the merchant or other party involved in the transaction. For example, in some embodiments single-action input alone may be sufficient to authorize payment when the transaction amount is less than a predetermined amount. The predetermined amount can be an amount provided set by the user, a financial institution, a default amount, etc. In some embodiments, multiple amounts are provided. For example, the user can provide default instructions relating to multiple amounts. In one embodiment, the default instructions require tiered levels of security such as the single action input for less than $20, a user name and password for amounts between $20 and $100, and a biometric scan for amounts greater than $100. The users may also determine that different transaction amounts require different single action inputs. For example, a user may decide that for transactions less than $10 selecting the Pay Now icon on the phone is sufficient to authorize payment. For transactions between $10-$20 a single action input comprising the pressing of multiple keys (e.g. "H" and "L") on the keypad simultaneously is required to authorize payment, for payments between $20-$50 a single action input comprising a voice authorization is required and for any transaction totaling more than $50 a full launch of the mobile wallet application 102 and input of a user name and password are required.

In some embodiments, the payment rules relate to the transaction location. For example, the user may provide instructions that a single action input consisting of the selection of a dedicated icon 111 is sufficient to authorize transactions within twenty miles of the user's home or business. In some embodiments, the system determines the user's location when the user is conducting a transaction by means of a positioning system, such as a GPS or software that determines the user's location based on proximity to cell towers. In an embodiment, the user provides instructions relating to distance from a predetermined location, such as the user's residence or billing address. In another embodiment, the payment rules relate to political boundaries, such as city, county, and state. When the system determines the user's location, that location can be cross-referenced to maps and/or coordinates. In this manner, the political boundaries in which the user is located can be determined. For example, the GPS on a user's cell phone can determine the user's latitude and longitude. The system can compare that latitude and longitude to maps and determine which city, county, and state the user is currently located within. The user may desire to allow a single action input to authorize payments transactions without further authentication if the mobile device 100 is within the user's home town.

In some embodiments, the payment rules relate to the transaction time. For example, the user's mobile device may include a clock or timer which determines the time at which the user is attempting to conduct the transaction. In an embodiment, the user provides instructions that allow transactions based on a single action input without additional authentication during predetermined time windows. For example, the user may allow transactions based on a single action input between 8 AM and 5 PM so that the user can quickly and easily conduct transactions during work hours. Alternatively, the user may require a specific single action input, such as the Pay Now icon between 8 AM and 5 PM and face recognition for transactions between 5 PM and 11 PM and a full username and password for any transaction between 11 PM and 5 AM. In another embodiment, the user provides instructions that a single action input is sufficient to authorize a payment if the user has authenticated his identity within a predetermined time period. For example, the user can provide instructions that allow transactions based on a specified single action input if the user has authenticated his identity within the previous twenty-four hours. When the user attempts to conduct a transaction, the system determines the current time and compares that time to the timing of the last authentication. If the user has authenticated his identity within the previous twenty-four hours, the system will allow wireless payment after receiving the appropriate single action input.

In some embodiments, the payment rules allow transactions based on a specified single action input when the transaction is within a specific category. For example, the user may instruct the system to allow transactions based on a given single action input at gas stations without further authentication. Other examples of transaction categories include grocery stores, coffee shops, restaurants, home goods stores, clothing stores, or other known or custom categories of stores. Certain stores may be included in more than one category. For example, some stores include both groceries and a pharmacy and may be included in the grocery store category and the drug store category. In some embodiments, the categories are defined by the financial institution. In other embodiments, the categories are defined by, edited, or modified by the user. In some embodiments, the user determines that a single action input is sufficient for general categories of goods. In other embodiments, the user sets different single action inputs in different categories. For example, gas stations may require only selection of a hotkey 104 and restaurants may require the input of a specified finger swipe pattern.

In a still further embodiment, the payment rules will allow a wireless payment based on a single action input based on the identity of the merchant. For example, the user may allow single action inputs to authorize payments to specific merchants. In some embodiments, the users can select the merchants from a list provided by the financial institution, the user can input specific merchants, the user can select merchants from previous transactions, the user can provide an indication during a transaction that future transactions with the merchant may be authorized by a single action input or the user can select merchants in any other way in which they are able to provide details regarding specific merchants. Accordingly, in some such embodiment, the user will allow transactions based on a single action input at merchants where the user has previously performed a transaction. For example, the user may authorize the wireless transfer of funds based on a single action input at merchants that the user has purchased from within the past month, or at merchants the user has purchased from more than ten times in the past year, or at merchants where the user has at any time performed a transaction, etc. In some embodiments the user can select a franchise merchant and allow transactions based on a single action input at any one of the franchise locations. In other embodiments, the user selects a specific franchise location of the franchise and does not expand the permission to include all other stores within the franchise.

In some embodiments, the payment rules relate to the user at the time of the transaction. For example, whether a single action input is sufficient to authorize a payment may depend on the status of the user's financial account information. In an embodiment, a specified single action input may authorize a payment so long as there is a minimum balance in the user's financial account. If the transaction would bring the account below a predetermined amount, the user will be required to fully launch the mobile wallet application and/or provide additional authentication to allow the transaction. In another embodiment, the payment rules will authorize a transaction from a single action input if the user has not performed a predetermined number of transactions recently. For example, the instructions may allow single action input transactions without further authentication if the user has performed fewer than twenty transactions in the current month. Both the number of transactions and the time period are customizable by the user. In a still further embodiment, the instructions allow transactions based on single action inputs until the user spends a certain amount in a predetermined period of time or within a specific budget category. For example, the user may be able to authorize payments after inputting a single action if the user has not spent above $400 in a month or if the user has not spent more than $400 on groceries in a given month. In such embodiments, all transactions after reaching the set limit may require additional authentication or input of a different single action input In yet further embodiments, the payment rules relate to the presence or absence of a specified individual. For instance, a predefined single action input may be sufficient to authorize a wireless payment if the camera 110 captures an image that is consistent with a stored image associated with an authorized user. In such embodiments, the user may take a picture of the user and/or members of the user's family that are authorized to make payments using a single action input and store the images in the memory of the mobile device 100. When the user attempts to make a payment based on a single action input the camera attempts to capture an image of the user and compares the image to those images stored in memory. If the images match, the payment will be authorized without further authentication. If the images do not match, the user may be required to provide additional authentication or a different single action input to authorize the transaction. As a further example, a parent may desire to limit when a dependent can make payments based on a single action input and the dependent is required to take an image of the parent any time he attempts to make a payment based on a single action input, or from a specific financial vehicle (such as a credit card). In other embodiments, the presence or absence of a specified individual may be determined from the presence or absence of specific electronic device. For instance, the mobile device 100 may be able to determine the presence of a previously recognized hands-free headset and conclude that the user is present and authorize the transaction based on a single action input. The mobile device 100 may also be able to detect a RF signal or a similar transmission to conclude the presence of a recognized electronic device (such as an associated key FOB, etc.) and allow payments based on a single action input if the other electronic device is present. For example, a user may carry a key FOB associated with the transaction system on her key chain as a level of added security resulting from knowing that both the user's keys and mobile device are present when a single action input is entered to authorize a wireless payment. In some such embodiments, if the other electronic device is not present, the user may be required to provide a different single action input or some form of further authentication.

In a still further embodiment, the payment rules are combined in a variety of ways. For example, the user can provide instructions that combine the number of recent transactions with the transaction categories. For example, a user may provide instructions allowing transactions based on a single action input for purchases at restaurants until the user has made more than six purchases at restaurants in the current month. Users can, for example, customize their instructions based on combinations of the transaction amount, transaction location, transaction time, transaction category, transaction merchant, account balance, number of transactions, and/or total expenses. The instructions provided by the user allow each user to customize a security protocol for conducting financial transactions using a single action input.

The exemplary embodiment of FIG. 1 illustrates general principles and embodiments of the system and method of providing a mobile transaction device. Further, as should be understood, the mobile transaction device may include any number of the input devices disclosed herein. Incorporation of one input device does not foreclose the use of another input device with the mobile transaction device. The examples included above and others will be discussed in greater detail herein below with reference to FIGS. 2-5.

FIG. 2 provides a block diagram illustrating a transaction authorization system 200 in a mobile commerce environment, in accordance with one embodiment of the present invention. In some embodiments, the transaction authorization system 200 includes a mobile device 202 such as a mobile phone, PDA, handheld computer, key FOB etc. The mobile device 202 typically includes one or more input devices 204, a telephone network interface 205, a wireless payment network interface 206, a power source 210, one or more output devices 248, a memory 230, a positioning device, such as a Global Positioning System 250 and a processor 208. The system 200 also generally includes a user 212, a financial institution server 215, and a POS Terminal 216 (which may be any other transaction device including, for example, an ATM, another mobile device, and/or the like) communicably coupled via a network 218.

As previously discussed, the input device 204 may include any number of mechanisms for receiving a single action input to authorize a wireless payment. For example, the input device may be a hotkey 220 (or any other key or combination of keys), a touch screen icon 222, a camera 224, a microphone 226, an accelerometer 228, a RF receiver 229 (or any other wireless signal receiver), and/or the like. In other embodiments, the system includes a scanner (not shown) or other input device. Any or all of the input devices may be included as part of the system. For example, a cell phone may have a hotkey, a touch screen icon, a camera, a microphone, and an accelerometer. Any one of the single action inputs may trigger the mobile device 202 to use the wireless payment network interface 206 to wirelessly transmit pre-selected payment information.

The wireless payment network interface 206 is a wireless transmitter or transceiver configured to communicate with a properly equipped POS terminal, ATM, or other transaction device via one or more wireless information protocols, such as NFC, Bluetooth, WIFI, or other RF protocols. As such, the wireless payment network interface 206 generally includes an antenna.

The telephone network interface 205 is a transmitter or transceiver configured to communicate over standard telephone networks. For example, and without limitation, the telephone network interface 205 can transfer data over 3G or 4G wireless networks. The telephone network interface 205 is included in the mobile device 202 for use as a mobile phone.

The network 218 may be a global area network (GAN), such as the Internet, a wide area network (WAN), a local area network (LAN), a WIFI network, a 3G network, or any other type of network or combination of networks. The network 218 may provide for wireline, wireless, or a combination of wireline and wireless communication between devices on the network. The network 218 illustrated includes several networks including a mobile telephone network, a local wireless payment network, a global payment transaction network, and perhaps the internet.

As used herein, the term "processor" generally includes circuitry used for implementing the communication and/or logic functions of a particular system. For example, the processor 208 may include one or more digital signal processor devices, microprocessor devices, and various analog-to-digital converters, digital-to-analog converters, and other support circuits and/or combinations of the foregoing. Control and signal processing functions of the system are allocated between these processing devices according to their respective capabilities. The processor 208 may include functionality to operate one or more software programs based on computer-readable instructions thereof, which may be stored in the memory 230.

The processor 208 is operatively coupled to the wireless payment network interface 206 and the input device 204. The processor 208 uses the wireless payment network interface 206 to establish connections with servers, computers, and mobile devices. Additionally the processor 208 uses the wireless payment network interface 206 to communicate with the network 218 and other devices on the network 218, such as, but not limited to, the POS terminal 216 and the financial institution server 215 via the POS terminal. The processor 208 may also be configured to communicate with the financial institution server 215 via the Internet, the telephone network, or a combination thereof.

In some embodiments, the transaction authorization system includes computer-readable instructions stored in the memory 230, which generally includes the computer-readable instructions of: a network interface module 234 configured to allow the mobile device 202 to interact with the network 218; an electronic wallet application 236, which manages the user's electronic payment vehicles and other virtual wallet functions; and a "quick pay" module 244, which in some embodiments receives and stores the single action inputs selected by the user to authorize a wireless payment and/or other procedures of the invention described and contemplated herein, and which may or may not be a sub-portion of the electronic wallet application 236. In some embodiments, the memory 230 also includes payment information for at least one payment vehicle 238. In yet further embodiments, the memory 230 includes default payment information 246, wherein one or more payment vehicles is associated with one or more single action inputs to authorize the wireless payment from the payment vehicle without further authorization after the single action input is received.

The network interface module 234 operates the wireless payment network interface 206 to communicate payment information with other transaction devices on the network 218. In an embodiment, the network interface module 234 communicates with servers, computers, other mobile devices, and point-of-sale devices. For example, the network interface module 234 may configure the wireless payment network interface 206 to communicate with the POS terminal 216 over the network 218.

The electronic wallet module 236 manages multiple payment vehicles and mobile wallet preferences. In some embodiments, the electronic wallet module 236 transmits payment information using multiple step procedures. In the context of the mobile transaction device, however, the electronic wallet module 236 may not be engaged at all or only minimally engaged in the transaction authorization process based on a single action input.

In some embodiments, the user may utilize the quick pay module 244 to create and store a plurality of single action inputs to immediately authorize default payments. For instance, the user may activate the quick pay module 244 and indicate the user wants to create a single action input utilizing the accelerometer 228 of the mobile device 202. After prompting the user, the user manipulates the mobile device 202 in the desired manner and the quick pay module 244 records the movement and stores the information in the memory 230 of the mobile device 202. In such embodiments, the quick pay module 244 may subsequently initiate transmission of the default payment information after receiving the previously stored movement via the accelerometer 228 of the mobile device 202. In an embodiment, the quick pay module 244 receives the single action input from the input device 204 and transfers payment information to the POS terminal 216 using the network interface module 234 and the wireless payment network interface 206. As another example, a user may trigger a hotkey 220 and the quick pay module 244 may automatically and immediately initiates transmission of the payment information using the wireless payment network interface 206.

In an embodiment, the payment information for at least one payment vehicle 238 is stored in the memory 230. The payment vehicle may be a credit card, debit card, gift card, rewards account, investment account, savings account, checking account, and/or the like. In an embodiment, the payment information for the payment vehicle is the information necessary to authorize a transaction from the payment vehicle. For example, the payment information for a credit card may be the card number, expiration date and security code. In another embodiment, the payment information for the payment vehicle is a unique identifier associated with the mobile device, wherein the unique identifier is linked to a payment vehicle on a server. In a still further embodiment, a plurality of payment vehicles with associated payment information is stored in the memory. For example, a user may store both a credit card and a rewards account in the memory of the mobile device.

In some embodiments, the default payment information 246 is stored in the memory 230. In an embodiment, the default payment information 246 is the payment information associated with a particular single action input. For example, the default payment information for triggering a hotkey may be the payment information associated with the user's credit card. In some embodiments, one or more default payment vehicles or default payment codes are associated with particular single action inputs. For example, a gift card code may be associated with a touchscreen icon on the mobile device such that when the icon is pressed, the gift card is automatically debited the amount of the transaction. In a still further embodiment, the default payment information is stored on a server and accessed when the POS terminal 216 transmits a unique code associated with the mobile device to the financial institution server 215.

In an embodiment not shown, the memory 230 includes a security module configured to maintain the security of the user's payment information on the mobile device and during the transaction. The security module contains data encryption software for protecting the payment information in the memory of the mobile device. A wide variety of encryption techniques are available for protecting data on a mobile device. Inclusion of the user's account number and other financial information in the mobile device indicates the desirability of having effective encryption techniques available. In another embodiment, the security module establishes a secure connection with the point-of-sale device. A secure connection is a connection that an unauthorized third party is unable to gain access to. In some embodiments, the secure connection is established solely by the mobile device. In other embodiments, the secure connection is established by the mobile device in cooperation with the point-of-sale device. In a still further embodiment, the security module controls security related to the input devices 204 as well. For example, the security module may encrypt the user's personal input data, such as facial scans and voice scans, so that third parties may not copy or view this information. In addition, in some embodiments, the security module evaluates the number of times the user has unsuccessfully attempted to authorize the transaction and locks the user out after a certain number of failed attempts. For example, the user may attempt to authorize a transaction using facial scanning input from the camera. If the incorrect user is attempting to do so, the facial scanning software will not recognize the user's face and hence not authorize the transaction. The security module can recognize this failure and if it happens a predetermined number of times, such as three times, the security module can lock the transaction authorization system down for security purposes. In other embodiments, instead of locking the mobile device down, the security module requires enhanced authentication procedures such as entry of a username and password.

In some embodiments, the power source 210 is a battery, such as a battery coupled to the mobile device. In other embodiments, the power source 210 is a receiver for receiving power from a remote source. For example, the power source may be receiver that receives power from a POS terminal via passive RF technology.

The transaction authorization system 200 is depicted in a mobile commerce environment including the user 212 of the mobile device 202, one or more financial institution servers 215, and one or more POS terminals 216. In some embodiments, the user 212 is a customer of a financial institution. For example, the user 212 may be a customer of a bank and link the user's bank accounts (which may be accessible via the financial institution server 215) to the user's mobile device 202. In another embodiment, the user 212 is not a customer of a financial institution. In some embodiments, the user 212 utilizes a personal account with the transaction authorization system, such as rewards points, prepaid accounts, or other personal accounts.

The POS terminal 216 may be a computer system at a merchant or other point of sale that handles the financial transaction during a sale, return, or other transaction. In other embodiments, the POS terminal 216 may be replaced with any other transaction device, such as an ATM or another mobile device. For example, the transaction authorization system may authorize transfers of funds from one user to another user rather than between the user and a merchant. Individuals wanting to gift money to a person, loan money to a person, or pay off a personal debt would find the ability to quickly and easily transfer money between mobile devices advantageous.

In some embodiments, the user interacts with the financial institution server 215. The financial institution server 215 is a computer system associated with a bank, credit union, or other provider of financial services. The financial institution server 215 contains information relating to the user's financial accounts (or other payment vehicles), such as the user's account number, the account balance, transactions, and credit limits. The financial institution server 215 may be accessed in order to download payment information and account information to the mobile device 202, to establish default payment vehicles, to create single-action transaction rules, and to request authorization for a transaction, as described in greater detail below.

In some embodiments, the POS terminal 216 is configured to complete the transaction using a standard global payment network and transaction processing system. For example, once the user's payment information is transferred to the POS terminal 216, the POS terminal 216 completes the transaction in a similar manner to current credit card and debit card transactions. The POS terminal 216 communicates with the financial institution server 215 to determine whether sufficient funds are available to complete the transaction.

It is understood that the servers, systems, and devices described herein illustrate one embodiment of the invention. It is further understood that one or more of the servers, systems, and devices can be combined in other embodiments and still function in the same or similar way as the embodiments described herein.

FIGS. 3a, 3b and 3c described below, illustrate process flows for using the mobile transaction device described above. It should be understood that the steps performed, in some cases, may be performed in a different order than the order shown, may be performed by different actors, or may not be performed at all. These figures depict only specific embodiments of the invention but do not limit the invention to the described steps.

FIG. 3a provides a flow diagram illustrating a process 300 for configuring a mobile transaction device, in accordance with embodiments of the present invention. As illustrated by block 305, the user of the mobile device installs payment information on the mobile device for a plurality of payment vehicles. For example, the user may first install an electronic wallet application on the mobile device to help the user manage the user's various payment vehicles on the user's mobile phone. The user may then be able to use the electronic wallet application to access, via the network, servers for each of a plurality of financial institutions in order to download payment information, e.g., encrypted account numbers, etc., associated with the one or more payment vehicles issued to the user from the financial institution. For example, a user may use her mobile phone to access Bank A and download the information needed to be able to make wireless mobile wallet payments from her checking account with Bank A. Alternatively, the user may be required to manually input information associated with a specific financial vehicle to allow the mobile wallet to utilize the financial vehicle to wirelessly transmit payments. For instance, the user may be required to input the name of the financial institution, account number and routing number to enable the mobile wallet to transmit payments form the user's checking account.

As illustrated by block 310, the mobile device receives payment information for a plurality of payment vehicles. In an embodiment, the mobile device receives the payment information from the user using an input device or from the financial institution server by means of the network interface module. For example, the user may enter the payment information into the mobile device using the touchscreen or the mobile device may receive the payment information wirelessly over a network from the user's bank. In some embodiments, the user selects the payment information to transfer to the mobile device using the Internet.

As illustrated by block 315, the mobile device stores the received payment information in memory. In an embodiment, the received payment information is stored for a plurality of payment vehicles in the memory of the mobile device. For example, payment information for a credit card and for a checking account may be stored in the memory of a mobile phone. In certain embodiments the payment information will be encrypted or otherwise segregated in the memory to avoid access by other applications within the mobile device.

As illustrated by block 320, the mobile device prompts the user to select a stored payment vehicle to use as a default payment vehicle. In an embodiment, an output device, such as a screen or speaker, requests that the user select a payment vehicle for use when the mobile transaction device is authorizing payment in response to the user's single action input. For example, a message may appear on the screen of a mobile phone requesting that the user select one of the three payment devices stored on the phone for use as a default payment option.

As illustrated by block 325, the user selects a default payment vehicle from the plurality of stored payment vehicles. In an embodiment, the user selects the default payment vehicle by using an input device to indicate her choice. For example, the user may select an account displayed on the touchscreen to indicate which payment vehicle should be used as the default payment vehicle.

As illustrated by block 330, the mobile device prompts the user to select a single action user input to associate with the default payment vehicle. In an embodiment, the mobile device prompts the user to create a single action input that will function to authorize wireless payments from the associated payment vehicle. In other embodiments, the user will be prompted to select one of the potential input devices for association with the default payment vehicle. For example, a message can appear on the screen requesting that the user select the hotkey, combination of hotkeys, application, or verbal command that will be associated with the default payment vehicle.

As illustrated by block 335, the user provides a single action user input. In some embodiments, the user provides the single action input by performing the single action input. For example, the user may depress the hotkey to indicate that the hotkey is the single action input that is to be associated with the default payment vehicle. Alternatively, the user will move the mobile device in a specific pattern to indicate the pattern of movement is the single action input associated with the default payment vehicle. Similarly, the user may provide a speech pattern, spoken command, retinal scan, combination of keys etc. to define what single action input will be associated with a specific payment vehicle. It should be understood that the steps performed in blocks 330 and 335 may be performed prior to the steps performed in blocks 320 and 325, or concurrently with, or in any order wherein a single action user input can be associated with a stored payment vehicle. It should be understood that in some embodiments the default payment vehicle will be the default payment vehicle associated with the specific single action input and that the user may create different default payment vehicles with different single action inputs. In some embodiments, providing a single action input also involves identifying the transaction parameters that will be associated with the single action input. For example, the user may indicate that a given movement of the mobile device will be sufficient to authorize payments from a debit card for amounts less then $20 or that the depression of specified keys on the keypad are sufficient to authorize wireless payments to a specific merchant.

As illustrated by block 340, the mobile device associates the selected default payment vehicle with the selected single action input in memory. In an embodiment, the process evaluates the user's selection of the default payment vehicle, the single action input and any specified transaction parameters and stores the association in the memory. For example, the user may have selected a credit card as the default payment vehicle and a touchscreen icon as the single action user input to be associated with the credit card to authorize payments up to a $1000 spending limit. The mobile device, thus, will store the association between the credit card and the touchscreen icon and the upper credit limit in the memory as default payment information. It should be understood that the process of selecting default payment vehicles and associated single action user inputs can be repeated for a plurality of payment vehicles and user inputs. For example, a user may select a credit card as a default payment vehicle for a first touchscreen icon, a checking account as a default payment vehicle for a specified combination of keys, and a rewards account as a default payment vehicle for a hotkey.

FIG. 3b provides a flow diagram illustrating a continuation of process 300 where the configured mobile transaction device is now used to engage in a transaction at a point-of-sale, in accordance with embodiments of the present invention.

As illustrated by block 345, when a user is proximate to a POS Terminal and engaged in a transaction the POS terminal transmits transaction information to the mobile transaction device. For example, if a user is purchasing a cup of coffee at a merchant that allows wireless payment, the cashier may enter the order information into a register, which in turns transmits the transaction information, such as the identity of the merchant, the nature of the order and the payment due to the mobile device. As shown at block 350 the mobile device receives the transaction information. In some embodiments, the mobile device is configured so that it is always prepared to receive the transmission of transaction information from a POS terminal. In other embodiments, the user may have activated the mobile wallet, a portion of the mobile wallet, a receiver etc. in anticipation of completing a transaction, which prepares the mobile device to receive a transmission from a POS terminal. It will be understood that "proximate" is a relative term that is affected by the strength of the wireless payment network interface and the receiver at the POS terminal.

As represented by block 355 the user performs a single action input. The single action input may be the single action input associated with the default payment vehicle or the payment vehicle that the user would like to use for the given transaction. The user enters the single action input using the input devices, such as a hotkey, camera, accelerometer, etc. For example, the user may trigger a hotkey associated with a credit card when the user is attempting to complete a transaction at a cash register.

As illustrated by block 360, the mobile device determines if the single action input provided by the user matches a single action input stored in the memory. In an embodiment, the processer determines what the single action input provided by the user consists of and reviews the memory to determine if the single action input matches one of the plurality of single action inputs previously stored in the memory. For example, the mobile device may detect that a touchscreen icon was selected and determine that the touchscreen icon matches a single action input stored in the memory. Alternatively, the processor may conclude that the user has depressed the letter "M" on the mobile device key pad and determine that the letter "M" does not match any single action input previously stored in the memory.

If the single action input provided by the user matches a single action input stored in memory, the mobile device identifies the default payment vehicle associated with the single action input and transmits an authorization and payment information to the POS terminal. In an embodiment, the wireless payment network interface is controlled by the network interface module to transmit the payment information associated with the single action input over the network to the POS terminal. For example, a transceiver in a mobile phone may wirelessly transmit the user's credit card information to a cash register in response to the user selecting a hotkey associated with the credit card. As illustrated at block 365, the POS terminal receives the authorization and payment information from the mobile device and at block 370 completes the transaction. In an embodiment, the POS terminal receives the payment information using an antenna. In a still further embodiment, the POS terminal decrypts the payment information after receiving it. For example, the POS terminal may receive the user's credit card information as it is being wirelessly transmitted from the mobile device. For instance, the mobile device may determine that the user has spoken the audio password associated with a gift card stored in the memory of the mobile device and transmit an approval along with the information needed by the POS Terminal to complete the transaction. The POS terminal receives the gift card information and the authorization and deducts the corresponding amount from the gift card balance and completes the transaction. It will be understood that there are a number of different ways for the mobile device and POS terminal to transmit the necessary payment information and complete a transaction. U.S. patent application Ser. No. 13/017,835 to Grigg et al., entitled "Transaction Authorization System for a Mobile Commerce Device" filed Jan. 31, 2011, previously incorporated herein by reference, describes a number of such alternate payment and transmission methods in greater detail.

In certain embodiments, if the single action input provided by the user at block 355 does not match a single action input stored in memory, the process flow moves to an alternate authentication procedure as illustrated in FIG. 3c. As illustrated at block 372 the user provides a username and password to the mobile device. In certain embodiments, the user provides the username and password as a prompt from the mobile wallet application during set-up of the application. Alternatively, the user may be prompted to provide a username and password as an alternate form of security once the user creates a single action input and associates it with a payment vehicle. In certain embodiments, the username and password will consist of a combination of alphanumeric characters selected by the user. However, the username and password may consist of any input that the mobile device is capable of receiving and storing in memory and that may be used to identify the user. As shown at block 374 the mobile device receives the username and password and stores them in memory. It will be understood that the steps illustrated at block 372 and 374 may occur at any time and will not necessarily occur after the user has provided a single action input that does not match a single action input stored in memory.

As represented by block 376, after the user provides a single action input that does not match a single action input in memory, in certain embodiments, the user will be prompted to input the username and password. In some embodiments, the processor after determining that the single action input provided by the user does not match a single action input stored in memory, the processor is configured to automatically generate a prompt on the screen of the mobile device requesting the user use the input devices of the mobile device to enter the username and password. In certain embodiments, this prompt will appear immediately after the user has provided a single action input that does not match the single action input stored in memory but in other embodiments, will occur after the user has been provided with a predetermined number of opportunities to correctly provide a single action input that corresponds to the single action input stored in memory. For instance, the user may be given three opportunities to provide a single action input that matches a single action input stored in memory and if after the third attempt is unsuccessful, will be asked to provide the username and password. However, in other embodiments, failure to provide a recognized single action input on the first attempt will result in the user being prompted to provide the username and password.

As shown at block 378, the user provides a username and password. The username and password may be inputted using any of the input devices of the mobile device. For instance, the user may use the touchscreen of the mobile device to key in the user's username and password.

At block 380, the mobile device determines if the username and password provided by the user matches the username and password stored in the mobile device's memory. If the username and password matches the username and password stored in the memory, in some embodiments the mobile device identifies the default payment vehicle and transmits an authorization and payment information to the POS terminal. In other embodiments, if the username and password matches the information stored in the memory, the user will be required to select the desired payment vehicle. As shown at block 382, the POS terminal receives the authorization and payment information and completes the transaction 384 as discussed previously herein.

In the event the username and password provided by the user does not match the username and password previously provided by the user and stored in memory, as represented by block 386, the mobile device will deny the transaction. For example, if the user utilizes the touchscreen of the mobile device to enter in an alphanumeric username and password and that username and password does not match the username and password stored in memory, the mobile device may terminate the mobile wallet application and no payment information will be transmitted to the POS terminal. In some embodiments, failure to enter the correct code will result in the mobile device being locked so that none of the functions of the mobile device are accessible until the user is able to verify his identity, for instance by presenting the locked mobile device to the financial institution or mobile device manufacturer with identification, etc. In certain embodiments, the user will be given a predetermined number of opportunities to enter the correct username and password before the transaction is denied. For instance, the user may be given three opportunities to enter the correct username and password before the transaction terminates.

Referring now to FIG. 4, which provides an example of a graphical user interface 400 associated with a mobile transaction device, in accordance with an embodiment of the present invention. In some embodiments of the invention, the graphical user interface 400 is generated on the screen of a mobile device by an electronic wallet application installed on the mobile phone. In other embodiments of the invention, the graphical user interface 400 is generated on the screen of a mobile phone by other software stored in the mobile device. The graphical user interfaces shown in FIGS. 4 and 5 may be presented in connection with the mobile device performing one or more of the steps described in the process flows associated with FIGS. 3*a*-3*c*.

The graphical user interface 400 includes a variety of tabs 404 for viewing and editing information related to the mobile transaction device 402. In the embodiment shown in FIG. 4, one of the tabs can be a home tab 406 that provides general information related to the mobile transaction device 402. For example, the home tab 406 can include information related to the current user 408 and the single action inputs for authorizing a transaction 410. In an embodiment, the accounts associated with each single action input are also disclosed. For example, a checking account may be associated with the single action input of the hotkey 412 while a credit account may be associated with the Pay Now Icon 414. In certain embodiments, categories of single action input that are available but not currently activated or associated with a payment vehicle are also indicated 416. For example, in the embodiment shown in FIG. 4 a user may elect to have the single action input of a fingerprint scan as the authorization to wirelessly transmit funds but the user has not yet provided an image of his fingerprint for comparison purposes. In still further embodiments, input types that are not supported by the current mobile device may be indicated 418, such as for example iris scanning. In another embodiment, the user is able to edit 420 the activation and saved input for the various input types directly from the graphical user interface 400. In another embodiment, the user is able to disable 422 the ability of mobile device to authorize payments using a single action input if other people have access to the device. In some embodiments (not shown), the user is able to disable the mobile transaction device 402 remotely so that if the mobile device is lost, the user is still able to disable the system.

Turning now to FIG. 5, an example of a graphical user interface 500 associated with accounts stored in the mobile transaction device is provided, in accordance with embodiments of the present invention. The interface includes the tabs 502 that allow the user to switch between multiple interfaces. In an embodiment, one tab provides content relating to account information 504. In some embodiments, the account information interface 500 includes content related to the user's active accounts 504. For example, the active account information 504 may include details relating to checking accounts 506 and credit accounts 508. Account information may include the account balance 510, whether the user has set a transaction parameter whereby a single action input will not be sufficient to authorize a wireless payment 512, and an indication of the single action input associated with the payment vehicle 514.

In an embodiment, the account balance is updated on a regular basis, such as after every transaction. In another embodiment, the user may trigger updating of the account balance by selecting a button 518 on the interface. The account balance may be updated on any frequency.

In some embodiments, the user sets a transaction parameter, such as a low balance limit at which point the user is no longer able to authorize wireless payments from the account with a single action input, e.g. $200.00 512. In some embodiments, the low balance limit disables the mobile transaction device so that no payments are possible from the given payment vehicle if the balance falls below the set amount. In other embodiments, the low balance limit will require the user to provide an alternate means, such as a username and password, to authorize the wireless payment. In certain embodiments, the mobile wallet application, or another software application will provide the user alerts as the account levels approach the low balance limit. In other embodiments, no such alerts are provided. In an exemplary embodiment, the user is able to customize the levels for the low balance limit and the alerts she receives by selecting the edit button 520 on the graphical user interface 500.

In some embodiments, the graphical user interface 500 will display the single action input currently associated with the active accounts. For instance, as shown in FIG. 5, a voice command 514 is currently saved and associated with the checking account. As shown, the user may edit the voice command from the graphical user interface 500 to store a different voice command as the single action input to authorize payments from the checking account 506. For instance, the user may have previously stored the voice command "Command 1" as the single action input associated with the checking account. To change the voice command, the user may select the edit button and speak "Command 2" into the voice input of the mobile device to save the new voice command as the single action input associated with the checking account 506.

In certain embodiments, the user will be able to set other limits in connection with other payment vehicles. For instance, the user may set an upper credit limit 506 associated with a credit card 508. In some such embodiments, if a transaction will cause the credit card to exceed the specified credit limit, the user will be unable to authorize the transaction using a single action input. In other embodiments, the user will be required to provide a different single action input, or other form of authentication to exceed the upper credit limit. In other embodiments, the user will be unable to authorize a transaction that causes the account balance to exceed the upper credit limit. As shown, in some embodiments, the user will be able to set the upper credit limit by selecting the edit button associated with the upper credit limit 506 and inputting the desired amount.

In certain embodiments, the user will be able to provide a single action input to be associated with a payment vehicle directly from the graphical user interface 500 by selecting the edit button next to Associate Input 526. After selecting the edit button the user can provide any of the single action inputs discussed and/or contemplated herein and have it stored in the memory of the mobile device and associated with a given payment vehicle, e.g. the credit card 508.

In some embodiments, the user is able to delete accounts 522 or add accounts 524 through the graphical user interface 500. It should be understood that the disclosed examples of controlling the mobile transaction device through the graphical user interface are not limiting. Given the disclosure herein, additional features are available to the user and may be viewed, edited, and saved through the graphical user interfaces associated with the system.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

These computer-executable program instructions may be stored or embodied in a computer-readable medium to form a computer program product that can direct a computer or other programmable data processing apparatus to function in a particular manner, such that the instructions stored in the computer readable memory produce an article of manufacture including instructions which implement the function/act specified in the flowchart and/or block diagram block(s).

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. An apparatus comprising:
   an input device, configured to receive input from a user:
   a communication device configured to transmit wireless signals to a transaction device;
   a memory comprising predetermined payment information stored therein comprising a user defined action for authorizing a wireless payment; and
   a processor communicably coupled to the input device, the communication device and the memory, wherein the processor is configured to operate computer instruction code to:
     receive a parameter from the user, wherein the parameter comprises a maximum time since a previous authentication;
     receive transaction information from the transaction device related to a transaction, wherein the transaction information comprises a current time;
     determine a time of a most recent authentication;
     determine a duration between the time of the most recent authentication and the current time;
     compare the duration to the parameter to determine when the duration is less than the maximum time since the previous authentication;
     receive a first input from the user;
     determine if the first input matches the user defined action for authorizing a wireless payment; and
     use the communication device to wirelessly transmit the predetermined payment information and authorize payment when the duration is less than the maximum time since the previous authentication and the first input matches the user defined action stored in the memory.

2. The apparatus of claim 1, wherein the apparatus is a mobile device.

3. The apparatus of claim 1, wherein the transaction device is a merchant point-of-sale terminal.

4. The apparatus of claim 1, wherein the communication device is a near field communication device.

5. The apparatus of claim 1, wherein the user defined action is selected from at least one of a button operatively coupled to the processor, a single key of the input device, combination of keys on the input device actuated simultaneously, a combination of keys on the input device actuated in a pattern, the actuation of a specific key of the input device after a predetermined number of random key strokes, a voice pattern, a spoken word, a spoken phrase, language patterns, biometric data, a specific movement of the apparatus, a specific change in the orientation of the apparatus or a selectable icon presented on a display of the apparatus.

6. The apparatus of claim 1, wherein the memory device further comprises an electronic wallet application stored therein and wherein the processor is further configured to use the wireless transmitter to wirelessly transmit default payment information to the transaction device without requiring the launching of the electronic wallet application prior to wirelessly transmitting the default payment information if the first input matches the user defined action stored in the memory.

7. The apparatus of claim 1, wherein the processor is further configured to send a denial notification to the merchant system if the first user input does not match the user defined action saved in the memory.

8. The apparatus of claim 1, wherein the processor is further configured to:
   request a user defined username and password;
   store the username and password in the memory;
   request the user provide the username and password if the first input received from the user does not match the user defined action saved in the memory;
   receive a second input from the user, wherein the second input comprises a username and password;
   determine if the second user input matches the username and password saved in the memory; and
   send an allowance notification to the transaction device if the second user input matches the username and password saved in the memory; or
   send a denial notification to the transaction system if the second user input does not match the username and password saved in the memory.

9. A computer program product, comprising:
   a non-transitory computer readable medium having computer-executable code stored in memory, the computer-executable code comprising:
   a code portion stored in the memory and configured to receive a parameter from the user, wherein the parameter comprises a maximum time since a previous authentication;
   a code portion stored in the memory and configured to receive transaction information related to a transaction from a transaction device wherein the transaction information comprises a current time;
   a code portion stored in the memory and configured to determine a time of a most recent authentication;
   a code portion stored in the memory and configured to determine a duration between the time of the most recent authentication and the current time;
   a code portion stored in the memory and configured to compare the duration to the parameter to determine when the duration is less than the maximum time since the previous authentication;
   a code portion stored in the memory and configured to receive a first input from the user;
   a code portion stored in the memory and configured to determine if the first input matches a user defined action for authorizing a wireless payment stored in a memory; and
   a code portion configured to use a communication device to wirelessly transmit predetermined payment information and authorize payment when the duration is less than the maximum time since the previous authentication and the first input matches the user defined action stored in the memory.

10. The computer program product of claim 9, wherein the transaction device is a merchant point-of-sale terminal.

11. The computer program product of claim 9, wherein the communication device is a near field communication device.

12. The computer program product of claim 9, wherein the user defined action is selected from at least one of a button operatively coupled to the processor, a single key of the input device, combination of keys on the input device actuated simultaneously, a combination of keys on the input device actuated in a pattern, the actuation of a specific key of the input device after a predetermined number of random key strokes, a voice pattern, a spoken word, a spoken phrase, language patterns, biometric data, a specific movement of a mobile device, a specific change in the orientation of the mobile device or a selectable icon presented on a display of the apparatus.

13. The computer program product of claim 9, wherein the computer-executable code further comprises a code portion comprising an electronic wallet application configured to use the communication device to wirelessly transmit the predetermined payment information to the transaction device without requiring the launching of the electronic wallet application prior to wirelessly transmitting the default payment information if the first input matches the user defined action stored in the memory.

14. The computer program product of claim 9, wherein the computer-executable code further comprises a code portion configured to send a denial notification to the transaction device if the first input does not match the user defined action saved in the memory.

15. The computer program product of claim 9, wherein the computer-executable code further comprises:
   a code portion stored in the memory and configured to request a user defined username and password and store the user defined username and password in the memory;
   a code portion stored in the memory and configured to request the user provide the username and password if the first input received from the user does not match the user defined action saved in the memory;
   a code portion stored in the memory and configured to receive a second input from the user, wherein the second input comprises a username and password;
   an code portion stored in the memory and configured to determine if the second user input matches the username and password saved in the memory;
   a code portion stored in the memory and configured to send an allowance notification to the transaction device if the second input matches the username and password saved in the memory; and
   a code portion stored in the memory and configured to send a denial notification to the transaction system if the second input does not match the username and password saved in the memory.

16. A method of authorizing a mobile transaction device payment, the method comprising:
   receiving a parameter from the user, wherein the parameter comprises a maximum time since a previous authentication;
   receiving transaction information from a transaction device related to a transaction, wherein the transaction information comprises a current time;
   determining a time of a most recent authentication;
   determining a duration between the time of the most recent authentication and the current time;
   comparing the duration to the parameter to determine when the duration is less than the maximum time since the previous authentication;
   receiving a first input from the user;
   determining if the first input matches a user defined action for authorizing a wireless payment; and
   wirelessly transmitting predetermined payment information and authorizing payment when the duration is less than the maximum time since the previous authentication and the first input matches the user defined action.

17. The method of claim 16, wherein receiving a security protocol from a user comprises receiving instructions for prompting the authentication modules and receiving user defined actions for authorizing wireless payments.

18. The method of claim 17, wherein the user defined actions are selected from a button operatively coupled to the processor, a single key of the input device, combination of keys on the input device actuated simultaneously, a combination of keys on the input device actuated in a pattern, the actuation of a specific key of the input device after a predetermined number of random key strokes, a voice pattern, a spoken word, a spoken phrase, language patterns, biometric data, a specific movement of the apparatus, a specific change in the orientation of the apparatus or a selectable icon presented on a display of the apparatus.

19. The method of claim 16, wherein determining that the user is conducting a transaction comprises receiving a signal from a point-of-sale device indicating that the user is attempting to conduct a transaction.

20. The method of claim 16 further comprising:
   receiving a username and password from the user;
   prompting the user to enter the username and password if the first input is not consistent with the required authentication module;
   receiving a second input from the user;
   comparing the second input to the username and password; and
   communicating predetermined payment instructions and authorizing the transaction if the second input is consistent with the username and password.

\* \* \* \* \*